Oct. 21, 1952     V. A. M. SWAN     2,614,805
POSTHOLE DIGGER
Filed Dec. 5, 1946     4 Sheets-Sheet 1
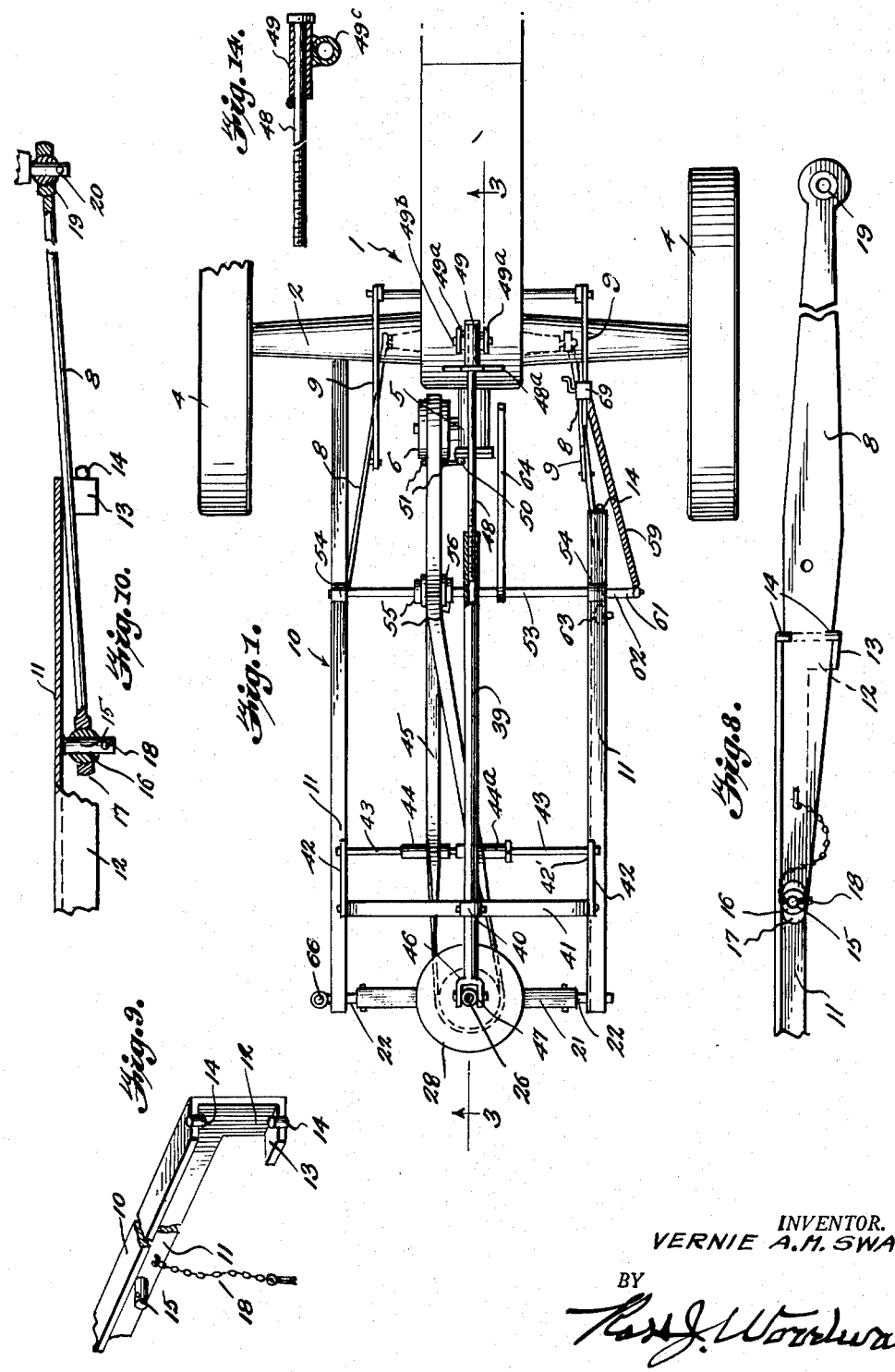
INVENTOR.
VERNIE A. H. SWAN
BY

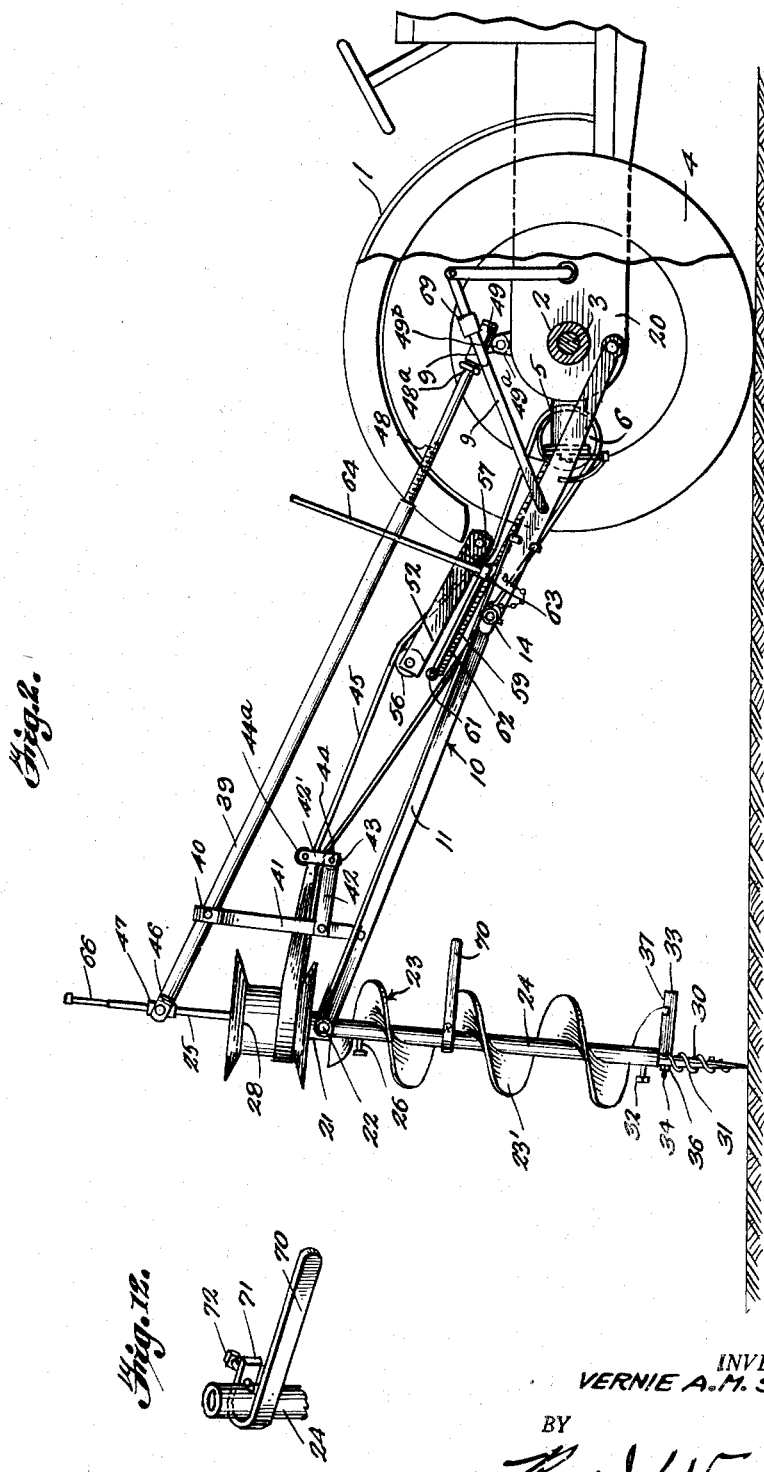

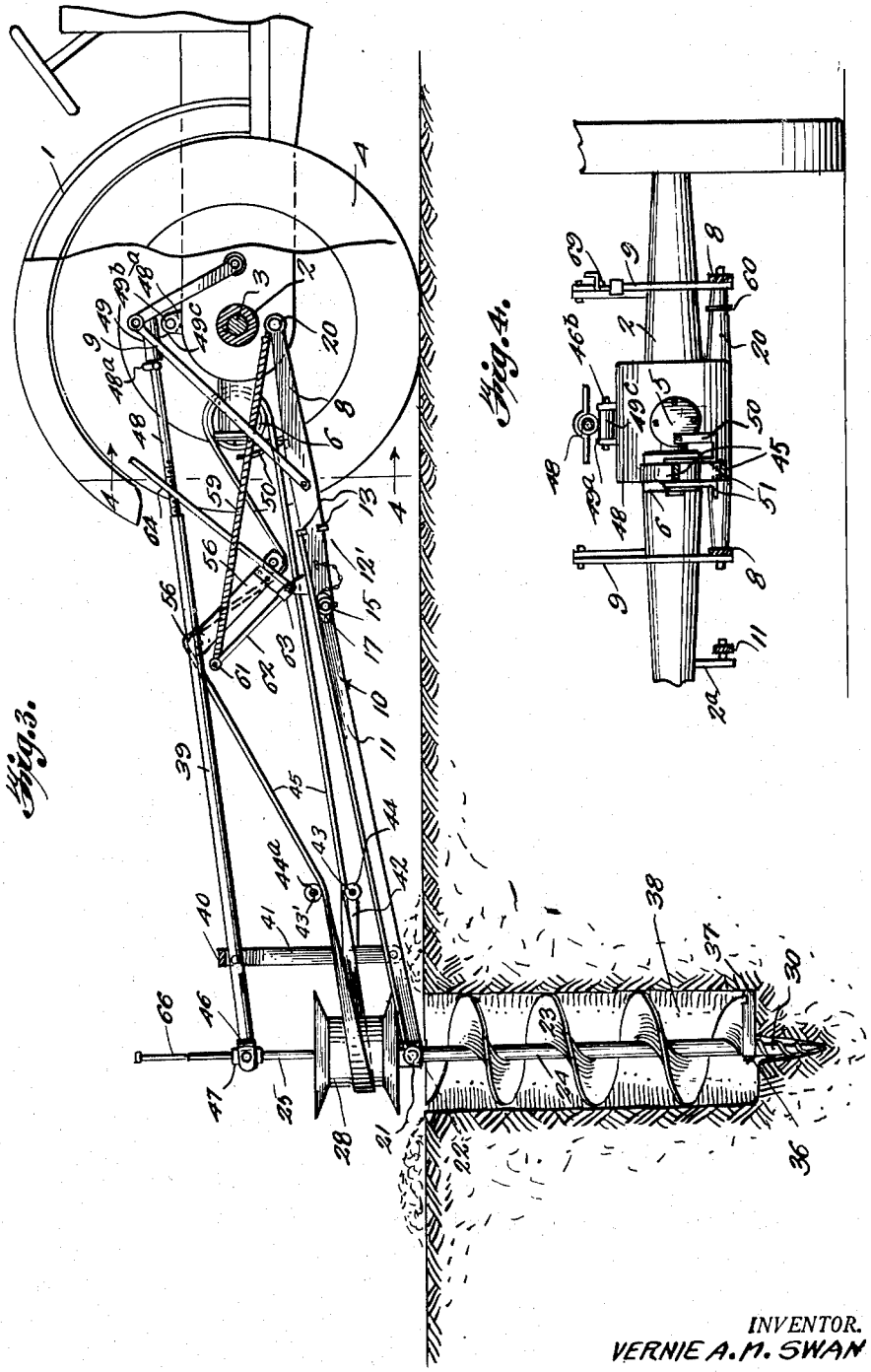

Oct. 21, 1952 — V. A. M. SWAN — 2,614,805
POSTHOLE DIGGER
Filed Dec. 5, 1946 — 4 Sheets-Sheet 4
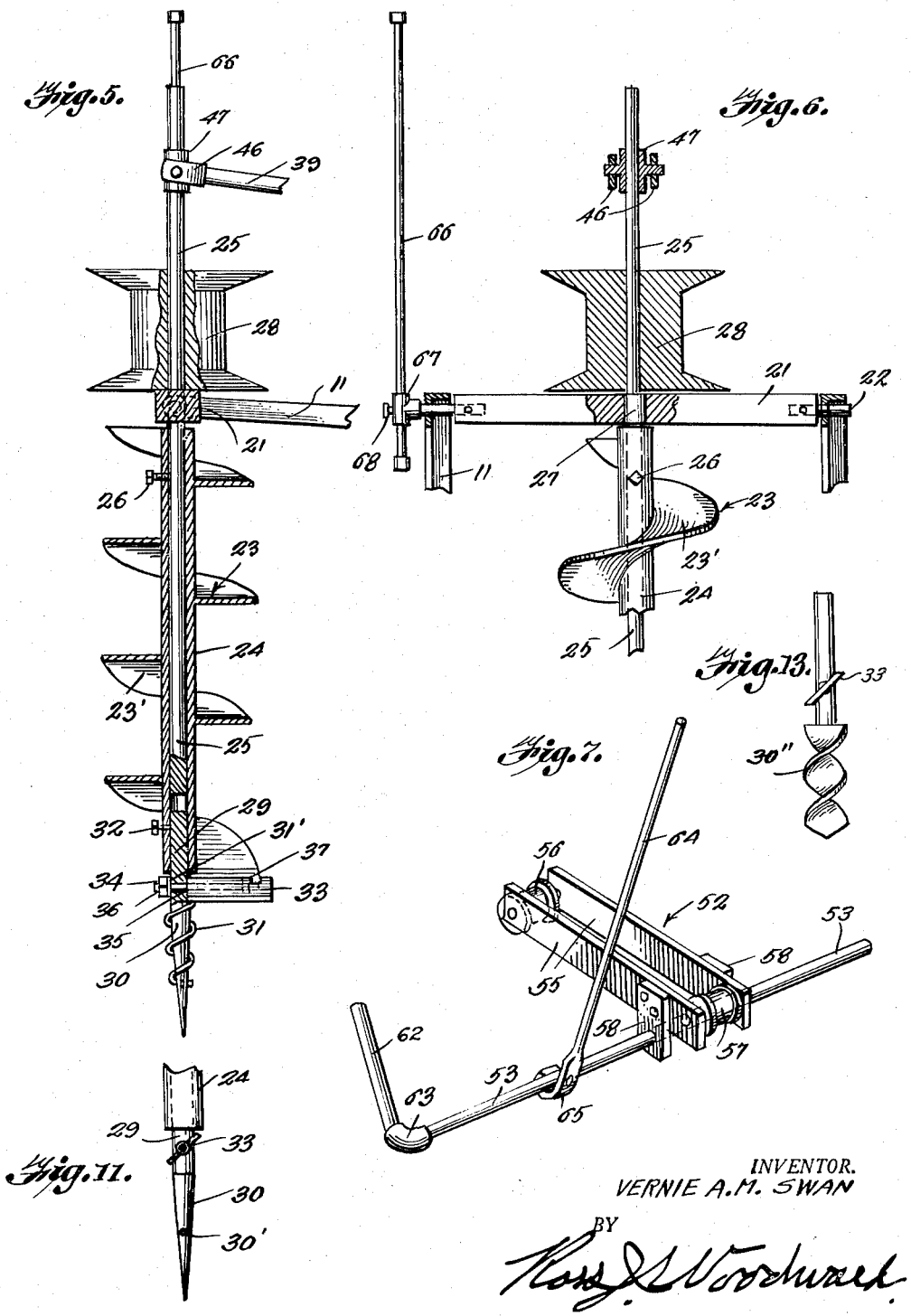
INVENTOR.
VERNIE A. M. SWAN Patented Oct. 21, 1952

2,614,805

UNITED STATES PATENT OFFICE 2,614,805

POSTHOLE DIGGER

Vernie A. M. Swan, Hartington, Nebr.

Application December 5, 1946, Serial No. 714,158

1 Claim. (Cl. 255—19)

This invention relates to post hole diggers and it is one object of the invention to provide a post hole digger adapted to be mounted back of a tractor and moved along a line where holes are to be dug at spaced positions to receive fence posts.

Another object of the invention is to provide a post hole digger of such construction that it will be power operated and driven from the power take-off belt pulley of the tractor.

Another object of the invention is to provide a post hole digger of such construction that it may be controlled by the operator of the tractor and thus make it unnecessary to have a special workman to attend the digger as well as an operator for the tractor.

Another object of the invention is to provide a post hole digger so formed that an auger used for boring holes in the ground may be angularly adjusted to any position relative to the frame carrying the auger and thus cause post holes to be dug vertically even if the tractor is traveling over sloping ground.

Another object of the invention is to provide a post hole digger with a drive belt for the auger shaft having a belt tightener associated with it and so formed that the operator of the tractor may move the tightener to a position for releasing pressure upon the belt and thus allow the auger to be withdrawn from a hole without turning and scraping sides of the formed hole.

Another object of the invention is to provide a post hole digger with an automatic belt tightener which keeps the belt tight enough at all times to turn the auger, but, when the digger strikes some solid obstruction such as rocks, old stumps, or roots, will allow the belt to slip and thereby prevent extreme damage to either the tractor or the digger.

Another object of the invention is to provide a post hole digger with a complete removable cutter head assembly consisting of a pointed bit which holds a double edge reversible cutter blade in a groove and a spiral wire worm for penetrating hard soil, each piece being easily replaced but the entire assembly being quickly removable from the sleeve by merely loosening one set screw at lower end of the auger sleeve.

Another object of the invention is to provide a cutter bit that is spirally formed or screw shaped to penetrate the hardest of soil such as limestone or chalk rock.

Another object of the invention is to provide a cutter blade which is extended a short distance beyond the auger so that the auger will not bind and cause undue drag in the hole.

Another object of the invention is to provide the auger of the post hole digger with an adjustable dirt sweep which may be set in a vertically adjusting position on the auger and serve to sweep or push the dirt away from the top of the hole so that the dug dirt will not have a tendency to fall back into the hole.

Another object of the invention is to so form the auger that the bit at its lower end will pull the auger downwardly during formation of a post hole.

Another object of the invention is to provide the digger with means for controlling the depth of the post holes.

Another object of the invention is to so form the post hole digger that it may be very easily applied to or removed from a tractor without the use of a bolt, nut or wrench, thus allowing the post hole digger to be stored in a barn or other shelter when not in use and allowing the tractor to be used for other work about a farm.

Another object of the invention is to provide a post hole digger which is simple in construction, easy to operate, and not liable to become broken when subjected to rough usage.

The invention is illustrated in the accompanying drawings wherein:

Fig. 1 is a top plan view of the improved post hole digger.

Fig. 2 is a side elevation of the post hole digger.

Fig. 3 is a sectional view taken along line 3—3 of Figure 1, and showing a post hole formed by the digger and the belt tightener in its pressure applying position.

Fig. 4 is a sectional view taken along the line 4—4 of Figure 3.

Fig. 5 is a view showing the hole-forming auger in vertical position.

Fig. 6 is a fragmentary view showing the upper position of the auger in elevation and its drum in section.

Fig. 7 is a perspective view of a belt tightener forming part of the improved post hole digger.

Fig. 8 is a view showing one side bar of the frame of the post hole digger connecting with a lift arm of the tractor.

Fig. 9 is a fragmentary perspective view of a connected position of the side bar and the lift arm.

Fig. 10 is a fragmentary view showing the mounting for a side bar at the right of the digger frame.

Fig. 11 is a side view of the auger bit.

Fig. 12 is a perspective view showing a portion of the auger and a scraper by means of which dirt is scraped from about the mouth of a post hole.

Fig. 13 is a side view of a modified form of bit.

Fig. 14 is a view showing the mounting for the front end of a bar constituting an element of the post hole digger.

This power driven post hole digger is intended for use upon large farms and ranches and by persons who make a business of erecting fences. While it has been stated that the device is used for digging fence post holes it will be understood that its use is not restricted to this as it could be used for digging holes to receive poles of the type used for supporting telephone and power wires.

The post hole digger is to be hitched back of a tractor of conventional form. Such a tractor is indicated in general by the numeral 1 and includes in its construction the usual casing 2 for the rear axle 3 upon which the rear wheels 4 are mounted and also a power take-off 5 equipped with a belt pulley 6. In addition the tractor has the usual lift arms 8 and connecting links 9 for adjusting the same.

The post hole digger is hitched back of the tractor midway the width thereof and has a frame 10, the side bars 11 of which are formed of angle iron. The left side bar which is longer than the right side bar is pivotally connected with the bracket 2a depending from the left side of the axle casing. The right side bar is formed with a depending extension 12 having a flange 13 extending outwardly from its lower end. The side flange of this side bar and the flange 13 of its extension 12 prevents the side bars from tilting vertically relative to the lift arm with which it is connected and the pins or lugs 14 prevent it from moving transversely of the lift arm. When connecting the side bar with the lift arm it is merely necessary to slide the rear portion of the lift arm through space between the lugs 14 and the extension 12 and then engage the pin 15 through the spherical bearing 16 mounted in the head 17 at the rear end of the left arm. A pin 18 is then passed through the outer end of the pin 15 and prevents the bearing 16 from slipping off of pin 15. It will thus be seen that the side bar may be very easily applied to or disconnected from the lift arm without use of a bolt, nut, or wrench and a great deal of time will be saved.

A bearing 19 is mounted through the front end of the right lift arm and engaged with the implement bracket 20 under the right hand side of the axle casing. A bridging bar 21 has pintles 22 at its ends which are rotatably received in openings formed at rear ends of the side bars 11 so that the bridge 21 may be turned to adjusted positions and cause the auger 23 to be disposed in a vertical position perpendicular to the surface of the ground.

This auger 23 has a blade or flight 23' extending spirally about a sleeve 24 through which a shaft 25 passes and terminates near the lower end of the sleeve. The auger is secured upon the shaft by upper set screw 26. The shaft 25 projects from the upper end of the sleeve 24 and its upper portion is journaled through a bearing 27 midway the length of the bridge and above the bridge carries a pulley 28. The lower end portion of sleeve 24 forms a socket into which is fitted the upper portion or shank 29 of a bit 30 and about this bit is wrapped a thick wire which forms a thread 31 for the bit. The bit is secured in the lower end of the sleeve by the lower set screw 32. A blade 33 projects radially from the upper end of the bit and at its inner end has a stem 34 which passes through an opening formed through the bit. The inner end of the blade is seated in a diagonally extending groove 35 formed in the shank of the bit so that when the nut 36 is applied to the stem 34 and tightened the blade 33 will be firmly secured to the bit and prevented from turning out of the pitched position shown in Figure 11. By loosening the nut the blade may be turned to an inverted position, and therefore both edges of the blade may be used. A notch 37 is formed near the outer end of the lower edge of the auger flight to receive the blade and brace the blade against transverse strains during formation of a post hole 38. The blade 33 is extended a short distance beyond the spiral blade or flight of the auger to prevent dragging the hole.

The lower end of the wire 31 may be passed through an opening 30' formed through the bit and its upper end is formed with an eye 31' through which the stem 35 passes or it may be wrapped about the stem and thereby firmly secured when the nut 36 is applied and tightened.

When limestone, chalk rock, and hard soil are to be bored to form post holes a spiral bit of the type shown in Figure 13, and indicated by the numeral 30'', may be used as such a bit will more readily cut through the hard earth formations.

A bar 39 passes through the crimped portion or eye 40 of a yoke 41 extending transversely of the frame and connected with the side bars 11 by rivets passing through the side bars and lower ends of the arms of the yoke, and this yoke carries forwardly extending arms 42 through which the ends of a shaft 43 are mounted. This shaft carries rollers 44 for engagement by a belt 45 which is trained about the pulley 28 and also passes about the belt pulley 6 so that power may be transmitted from the power take-off belt pulley of the tractor. One of the arms 42 has an upstanding extension 42' from which extends a shaft 43' carrying a roller 44a which overlies the upper flight of the belt. The bar 39 is provided at its rear end with forks 46 carrying a bearing 47 through which the upper portion of the auger shaft passes and the front end of the bar 39 is internally threaded and engaged with a threaded bar 48. This bar or rod 48 is journaled through a coupling 49 which is tiltably mounted between the ears 49a of the tractor by a pin 49b passed through a sleeve 49c carried by the coupling and engaged in the ears. When the bar or rod 48 is turned by means of its cross bar or handle 48a the coupling will be tilted as the bar 39 is shifted longitudinally to tilt the auger and the auger may thus be held in an angularly adjusted position. Since the auger shaft is mounted through the bearings 27 and 47 it will be held in a perpendicular position and the post holes so bored that posts mounted in holes bored along a fence line will be disposed upright in vertical spaced and parallel relation to each other. The belt must remain in engagement with the pulley 6 and in order to prevent it from slipping off of this pulley there has been provided a bracket 50 secured to the power take-off 5 and carrying arms 51 which extend upwardly therefrom at opposite sides of the belt close to the pulley.

The belt 45 imparts rotary motion to the auger shaft when it is tightened but when it is allowed to have slack the tractor power take-off pulley 6 will rotate within the belt without rotating the auger shaft and the auger. In order to control tightness of the belt there has been provided a belt tightener 52 formed as shown in Figure 7, and carried by a rocker shaft 53 which extends transversely across the frame 10 for the entire width thereof and is rotatably mounted through bearings 54 carried by the two side bars 11 of the frame. The tightener has side bars 55 between ends of which rollers 56 and 57 are rotatably mounted for engaging only the upper flight of the belt. The side bars 55 extend across the rocker shaft 53 and are riveted to arms 58 which extend downwardly from the side bars and are rigidly secured to the rocker shaft. When the belt tightener is in its normal position shown in Figure 3 it has a tendency to extend vertically due to action of the spring 59, and the rollers apply pressure to the upper flight of the belt and cause the upper flight of the belt to assume an inverted S-shape over its pulley 56 and under the pulley 57 so that the belt will be tightened and rotary motion imparted to the auger. When the tightener is tilted to the inclined position shown in Figure 2 pressure upon the upper flight of the belt will be relieved and the belt will slip about the power take-off pulley without being moved thereby and rotation of the auger shaft will stop. Therefore rotation of the auger may be stopped while extracting it from a formed post hole and the walls of the hole will not be gouged during upward movement of the auger out of the hole. The spring 59 which urges the belt tightener toward its pressure applying position for tightening the belt has its front end engaged with an anchoring ring 60 fitting about the implement bracket 20 under the right hand side of the axle casing, and its rear end connected with the side extension or finger 61 of an arm 62 which projects from one end of the rocker 53 and is connected therewith by an elbow 63. A lever 64 having a hooked lower end 65 secured about the rocker shaft 53 projects from the rocker shaft in a position permitting it to be grasped by the operator of the tractor. When rotation of the auger is to be stopped it is merely necessary to grasp this lever and swing it rearwardly in order to rotate the shaft 53 in a direction to swing the bars 55 downwardly and thus move the belt tightener from the operative position of Figure 3 to the pressure releasing position of Figure 2. After rotation of the auger has been stopped the lifting mechanism of the tractor is actuated and as its connecting links 9 swing upwardly, the lift arms 8 will be swung upwardly and the frame 10 moved upwardly to extract the auger from the formed post hole. A bar 66 which is mounted vertically through a sleeve 67 carried by the pintle 22 at one end of the bridge 21 and secured in a set position by a set screw 68 limits downward movement of the frame 10 and the auger by contact of the lower end of the bar with the ground at a side of the hole being dug and all holes will be of the same depth. By rotating the rod 48 in the coupling 49 its threaded connection with bar 39 causes the bar to be shifted longitudinally, pivotal connection of the arms of yoke 41 with the side bars 11 permitting this, and as the rear end of the bar 39 is pivoted to the bearing 47 through which the auger shaft passes longitudinal movement of the bar 39 will cause the auger shaft and the bridging bar 21 to be tilted axially of the pintles 22. Therefore the angular position of the auger shaft will be varied and the auger may be angularly adjusted forwardly and rearwardly relative to the frame. By adjusting the length of one of the connecting links 9 by sliding its rear section through the coupling 69 and then tightening the set screw of the coupling the frame 10 may be canted for transverse angular adjustment of the auger.

In order to move dirt away from the ground about the top of the hole dug by the auger there has been provided a bar or sweep 70 having a clamp of such size that it may be engaged about the auger shaft or sleeve 24 and the set screw 72 then tightened to grip the sleeve and firmly secure the sweep in a set position. By setting the sweep a distance about the lower end of the auger about one foot less than the depth of the hole to be dug it will contact a mound of dirt about the hole when nearly fully dug and as it moves in a circular path it will serve very effectively to clear the ground of dirt about the hole by the time the hole is fully dug and the auger may be withdrawn without dirt falling into the hole. If the hole is to be dug the full depth of the auger the sweep may be removed, as shown in Figure 3.

Having thus described the invention, what is claimed is:

A post hole digger comprising a frame adapted to be mounted back of a tractor having a power take-off and swung vertically to raised and lowered positions, an auger disposed vertically under the rear end of the frame, a shaft for said auger projecting upwardly therefrom and rotatably mounted through a portion of the frame, a yoke extending transversely of the frame and projecting upwardly therefrom, a bar extending longitudinally of the frame and in spaced relation to its rear end being pivotally connected with said yoke for vertical tilting movement, a rod threaded at its rear end to the front end of said bar, a sleeve rotatably holding the front end of said rod and adapted to be pivotally connected with the tractor for vertical tilting movement, a bearing pivotally mounted in vertical position at the rear end of the bar for tilting about a horizontal axis and through which the upper portion of the auger shaft rotatably and slidably passes, said rod when turned in the sleeve shifting the bar longitudinally by its threaded engagement therewith and thereby tilting the auger shaft in a direction longitudinally of the frame and angularly adjusting the auger, and means for transmitting rotary motion from the power take-off of the tractor to the auger shaft.

VERNIE A. M. SWAN.

REFERENCES CITED

The following references are of record in the file of this patent:

UNITED STATES PATENTS

| Number | Name | Date |
| --- | --- | --- |
| 326,976 | Hagans | Sept. 29, 1885 |
| 675,720 | Deemer | June 4, 1901 |
| 1,118,733 | Brooks et al. | Nov. 24, 1914 |
| 1,882,350 | Weiss | Oct. 11, 1932 |
| 2,251,506 | Tichy, Jr. | Aug. 5, 1941 |
| 2,320,612 | Kandle | June 1, 1943 |
| 2,320,775 | Garner | June 1, 1943 |
| 2,321,680 | Houston | June 15, 1943 |
| 2,410,508 | Lamme | Nov. 5, 1946 |
| 2,425,132 | Stokes | Aug. 5, 1947 |
| 2,461,373 | Cox | Feb. 8, 1949 |
| 2,490,698 | McClenny | Dec. 6, 1949 |
| 2,493,261 | Porter et al. | Jan. 3, 1950 |
| 2,521,895 | Bunting | Sept. 12, 1950 |